Aug. 13, 1940.  W. H. MILLER  2,211,147

FLEXIBLE HOSE CONNECTION

Filed May 1, 1939

INVENTOR
BY William H. Miller.
Everett H. Wright
ATTORNEY

Patented Aug. 13, 1940

2,211,147

UNITED STATES PATENT OFFICE 2,211,147

FLEXIBLE HOSE CONNECTION

William H. Miller, Royal Oak, Mich., assignor to The Flex-O-Tube Company, a corporation of Delaware Application May 1, 1939, Serial No. 271,021

2 Claims. (Cl. 285—34)

This invention relates to a novel method and means for connecting flexible hose to hose couplings and the like.

Flexible hose assemblies comprising a flexible hose with hose coupling means on the ends thereof are employed in many and various types of hydraulic systems including the fuel, lubricating, heating and cooling systems of automobiles, aircraft, motor boats and the like. The hose couplings are usually adapted to receive the end of a flexible hose which is anchored therein by crimping the coupling so as to squeeze the hose. If the flexible hose is crimped too tightly by the coupling or the like to which it is connected, it tears at the crimp under repeated flexing, and, if the flexible hose is crimped too loosely by the coupling to which it is connected, it is easily pulled loose therefrom.

Inasmuch as the safety of the crew and passengers of aircraft and the freedom from service of other vehicles and machinery employing flexible hose connections to and from hydraulic systems thereof depends largely upon the permanency of the connection of the flexible hose to the hose coupling means employed, it has become a major problem to provide a positive and lasting connection between a flexible hose and its coupling means.

It is especially difficult to provide a permanent leakproof connection between a smooth surfaced flexible hose having a lacquered finish and a hose coupling which will offer sufficient resistance to tensional failure, i. e., pulling apart, and at the same time avoid crimping the coupling so deep into the flexible hose as to damage the same.

With the foregoing in view, the primary object of this invention is to provide a novel method and means for making a positive leak-proof connection between a flexible hose and a hose coupling which will not damage the hose and which will withstand heavy tensional stresses applied to the flexible hose tending to part the said hose from the coupling.

Another object of the invention is to provide a positive leak-proof tension resisting connection between a flexible hose and a hose coupling accomplished by the ordinary swaging operation which, after swaging, provides a thorough wedge anchorage for the flexible hose within the hose coupling whereby to materially increase the tensional strength between a smooth surfaced flexible hose and its coupling.

Other objects of the invention will become apparent by reference to the following detailed description taken in connection with the accompanying drawing, in which.

Figure 1:
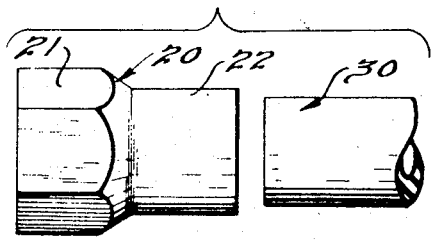
Fig. 1 is an exploded elevational view of a hose coupling and a flexible hose to be connected thereto.

Referring now to the drawing wherein like numerals refer to like and corresponding parts throughout the several views, the invention is disclosed in conjunction with a female hose coupling, however, it is to be understood that the invention may be used with and applied to various other types of hose connections and couplings as may be desired or required.

Figure 2:
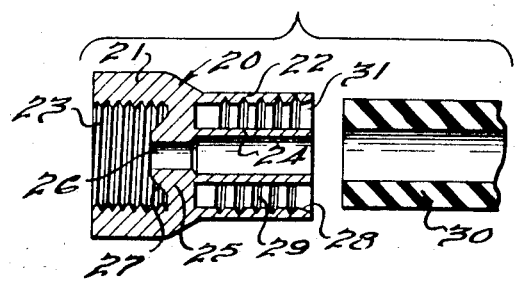
Fig. 2 is an exploded sectional view of the hose coupling and flexible hose shown in Fig. 1.
Figure 3:
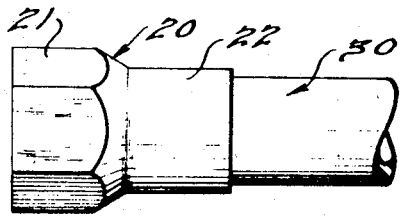
Fig. 3 is an elevational view of the hose coupling and flexible hose disclosed in Figs. 1 and 2 after assembly but before swaging.
Figure 4:
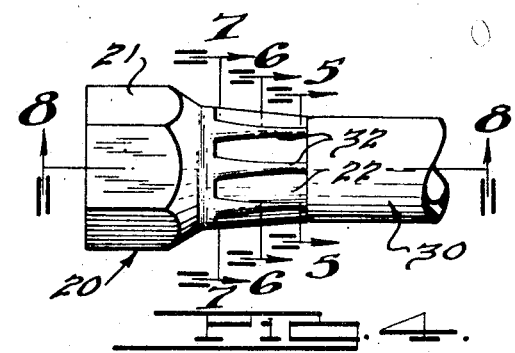
Fig. 4 is an elevational view of the hose coupling and flexible hose shown in Figs. 1, 2 and 3 after swaging.

The female flexible hose coupling 20 disclosed in Figs. 1, 2 and 3 comprises a hexagon head 21 and an annular shell 22 formed integral with the said hexagon head 21 and disposed axially opposite a threaded bore 23 therein. A hollow stem 24 concentrically disposed within the said annular shell 22 extends from the base 25 of the hexagon head 21 axially co-extensive with the said annular shell 22. The base 25 of the hexagon head 21 is provided with a bore 26 therethrough communicating between the counterbore 23 and the hollow stem 24, and, if desired, the base 25 of the hexagon head 21 may be provided with a suitable frusto-conical seat 27 against which a complementary seat in the end of the stem of a male coupling or nipple becomes engaged when threaded into the said female coupling 20.

Figures 5, 6, 7:
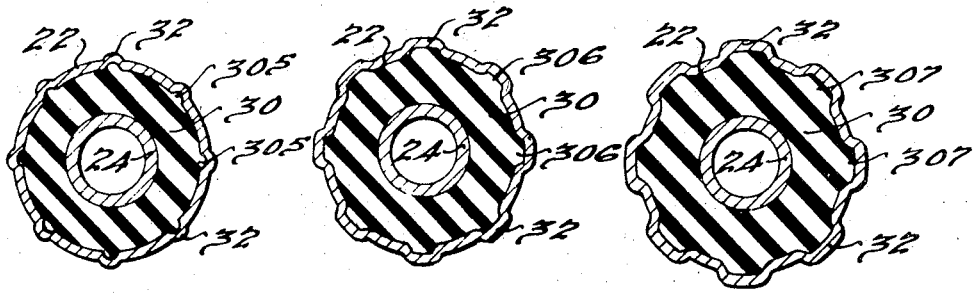
Figs. 5, 6 and 7 are cross-sectional views showing how the flexible hose is wedged between the shank and inner stem of the hose coupling by swaging the shank of the hose coupling.
Figure 8:
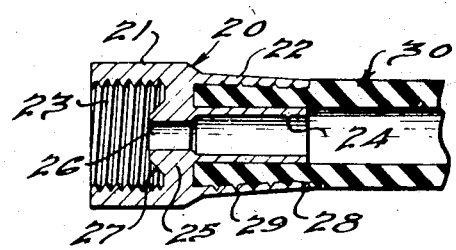
Fig. 8 is a longitudinal sectional view taken on the line 8—8 of Fig. 4.

The inner periphery of the said annular shell 22 is preferably provided with a flare 28 and coarse threads 29 which are employed to aid in telescoping the flexible hose 30 into the annular recess 31 between the annular shell 22 and hollow stem 25. The said hose coupling 20 and flexible hose 30 shown unassembled in Figs. 1 and 2 are first assembled as indicated in Fig. 3, after which the outer annular shell 22, instead of being crimped peripherially as is customary is swaged to form a plurality of circumferentially spaced axially disposed wedges 32 as best shown in Figs. 4, 5, 6, 7 and 8. The said wedges 32 are each formed to engage the flexible hose 30 tighter at the extreme end of the annular shell 22 than at the end thereof nearest the hexagon head 21 of the coupling 20 as best shown in Figs. 5, 6 and 7.

After forming the said wedges 32 by a swaging operation or the like the portion 307 of the flexible hose 30 must be gradually compressed to the size of the portion 306 thereof and the size of the portions 307 and 306 of the said flexible hose 30 must be compressed to the size 305 thereof as shown in Figs. 7, 6 and 5 respectively, or the outer annular shell 22 must become distorted when the hose 30 is pulled from the coupling 20.

It has been found that in the novel swaged wedge type connection between a flexible hose and a hose coupling disclosed herein, the resistance to the parting of the flexible hose and the coupling when under tensional stress is materially increased without unduly squeezing the flexible hose as in connections in which one or more peripheral crimps are employed. Therefore, the novel connection disclosed herein provides means for connecting a flexible hose to a hose coupling or the like which avoids deep crimping of the coupling onto the flexible hose and thereby permits much sharper and repeated flexing of the hose with respect to its coupling without tearing or damaging the flexible hose or its covering.

Figure 9:
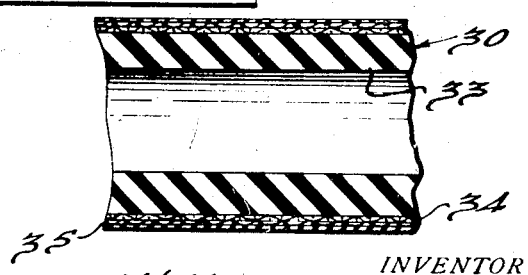
Fig. 9 is an enlarged sectional view of one of the types of reinforced flexible hose having a smooth rubber or lacquered cover for which the novel method and means disclosed herein for accomplishing a connection to a coupling or the like is particularly desirable.

The invention is particularly advantageous where flexible hose of the general type disclosed in Fig. 9 is connected to a hose coupling or the like. The flexible hose 30 disclosed in Fig. 9 is composed of a rubber or Neoprene tubing 33 covered with a braided Neoprene or a built-up coating of lacquer or the like as indicated by the numeral 36 in the drawing. The smoother the exterior surface of the flexible hose 30 the more desirable the novel swaged wedge coupling means disclosed herein becomes.

Although but one embodiment of the invention has been disclosed and described herein, it will be understood that various changes including the size, shape, arrangement and detail of the various parts thereof may be made without departing from the spirit of the invention, and it is not intended to limit the scope of the invention other than by the terms of the appended claims.

I claim:

1. A flexible hose coupling means including an annular inner stem and an outer shell projecting therefrom having the end of a flexible hose telescoped therebetween, the said outer shell being formed into a plurality of circumferentially spaced longitudinally disposed depressions forming therebetween wedge-shaped ribs gradually tapering to a constricted cross sectional area at the point where the said flexible hose enters the outer shell of the said coupling means whereby to positively grip the flexible hose without cutting into the surface thereof.

2. A flexible hose coupling means including an annular inner stem and an outer internally threaded shell projecting therefrom having the end of a flexible hose threaded therebetween, the said outer shell being formed into a plurality of circumferentially spaced longitudinally disposed depressions forming therebetween wedge-shaped ribs gradually tapering to a constricted cross sectional area at the point where the said flexible hose enters the outer shell of the said coupling means whereby to positively grip the flexible hose without cutting into the surface thereof.

WILLIAM H. MILLER.